UNITED STATES PATENT OFFICE.

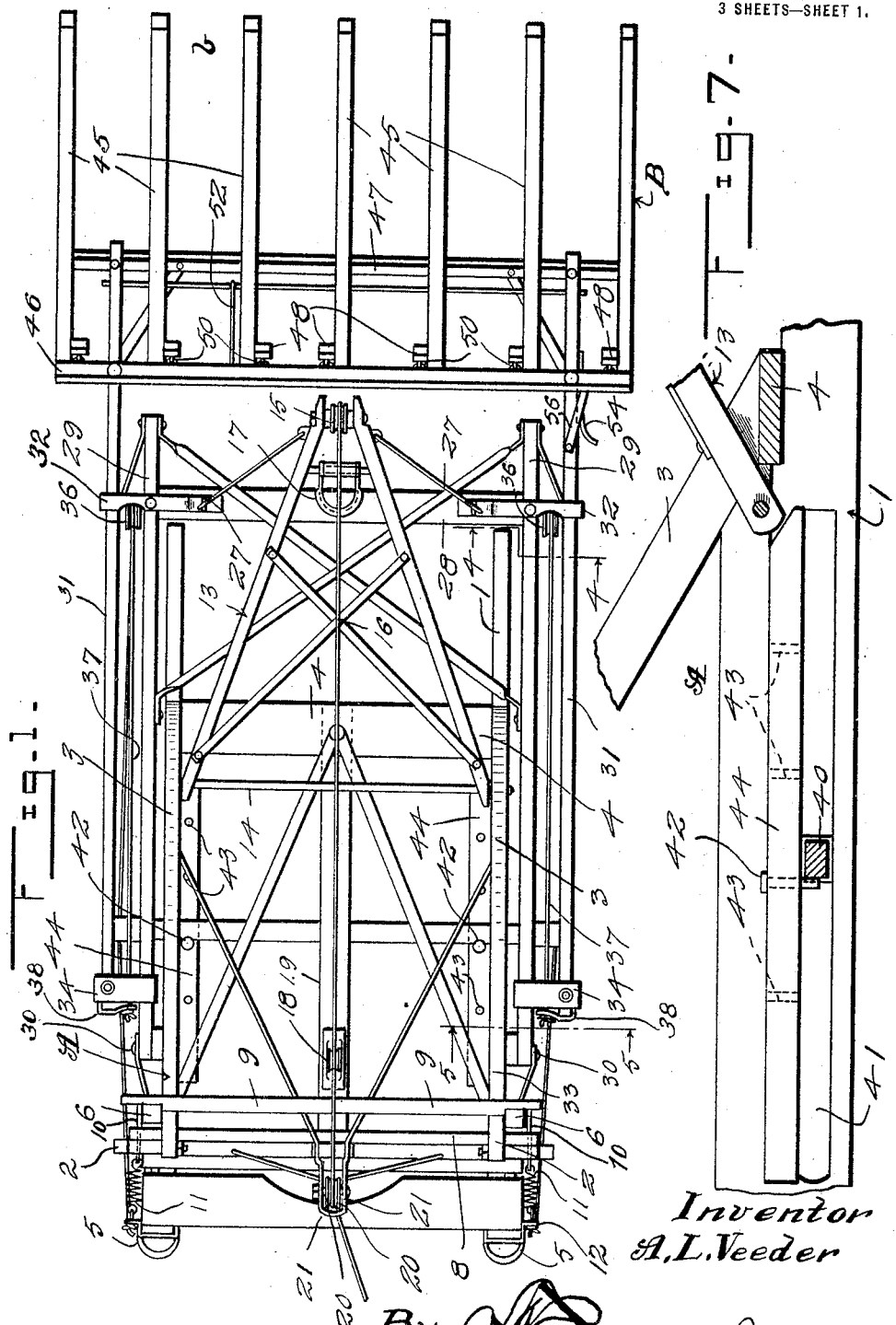

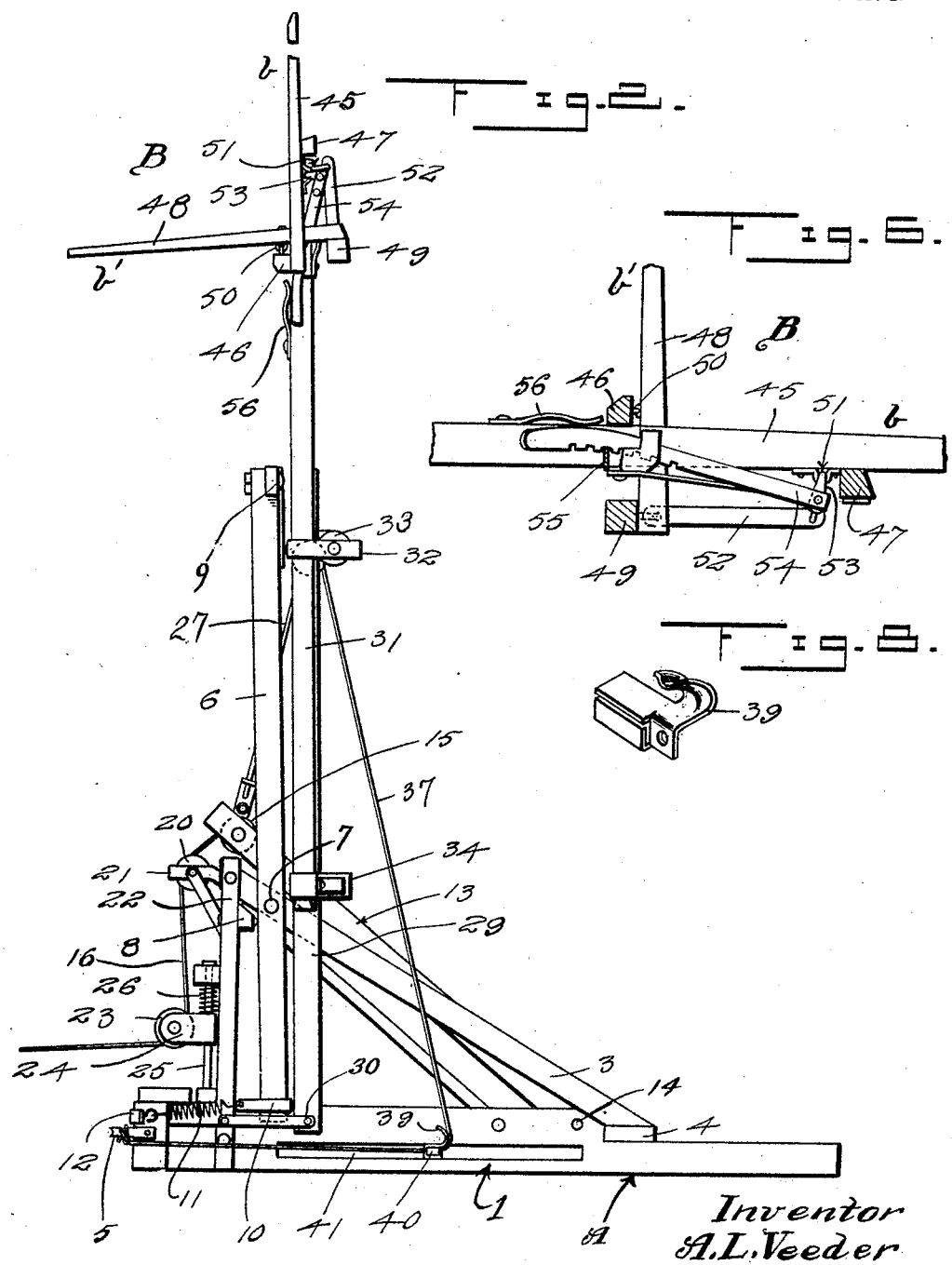

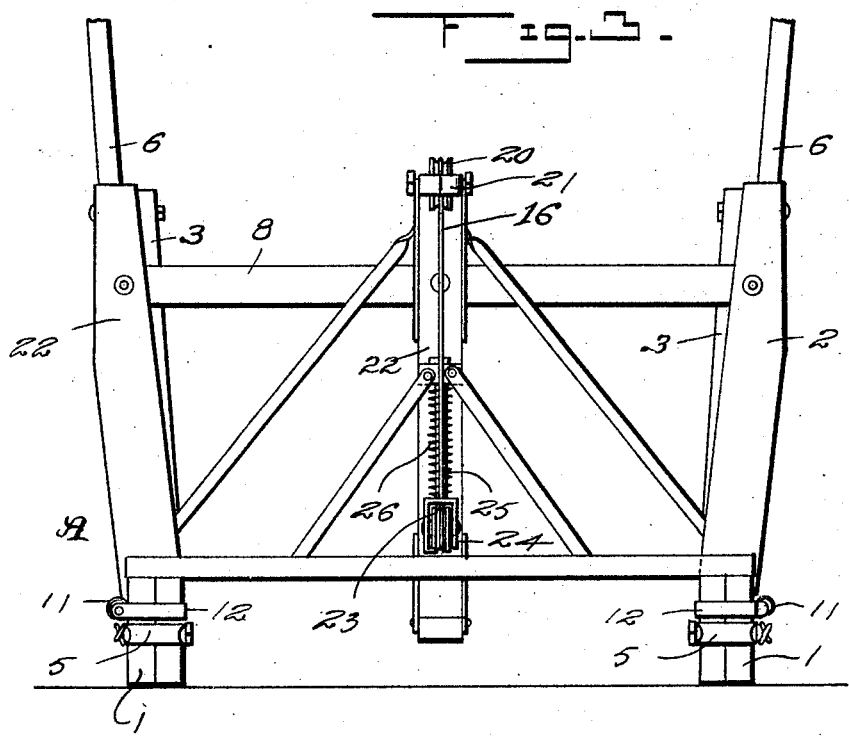
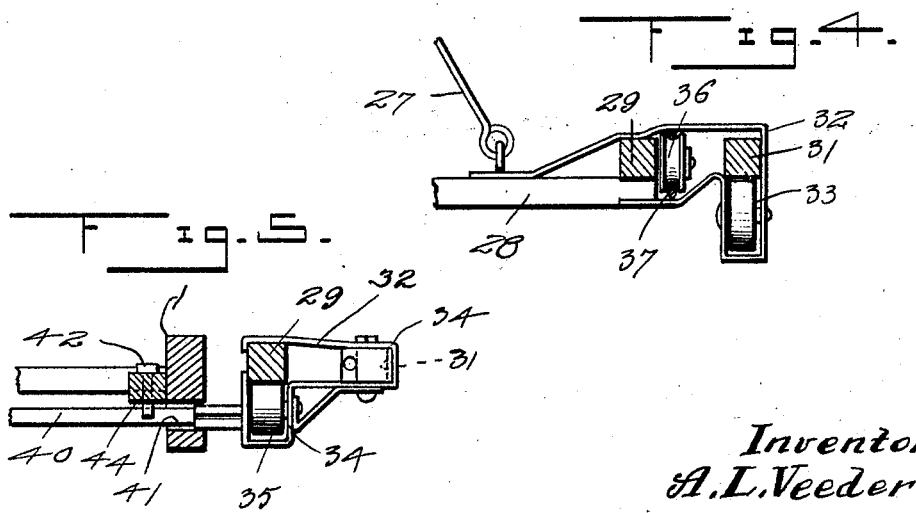

ALBERT L. VEEDER, OF IDAHO FALLS, IDAHO.

HAYSTACKER.

1,392,991.

Specification of Letters Patent.

Patented Oct. 11, 1921.

Application filed May 6, 1919. Serial No. 295,145.

*To all whom it may concern:*

Be it known that I, ALBERT L. VEEDER, a citizen of the United States, residing at Idaho Falls, in the county of Bonneville and State of Idaho, have invented certain new and useful Improvements in Haystackers; and I do hereby declare the following to be a full, clear, and exact description of the invention, such as will enable others skilled in the art to which it appertains to make and use the same.

This invention relates to stackers, and more particularly to a machine specially adapted for stacking hay and similar agricultural products.

One of the main objects of the invention is to provide a hay stacker of comparatively simple construction and operation in which the hay to be stacked may be elevated and discharged upon the stack being formed.

A further object is to provide a resiliently mounted striking frame positioned to be struck by the side bars of the stacker frame, when the latter frame is raised into its uppermost position, so as to insure proper discharge of the hay from the stacker head while also reducing jars and strains incident to the stacking operation to a minimum.

A further object is to provide simple and efficient means whereby the height to which the stacker head is raised may be easily and accurately regulated so as to insure proper deposit of the hay upon the stack being formed.

Further objects will appear from the detailed description.

In the drawings:

Figure 1 is top plan view of a stacker constructed in accordance with my invention.

Fig. 2 is a side view of the same showing the stacking frame in raised or operative position.

Fig. 3 is a front view.

Fig. 4 is a section taken substantially on line 4—4 of Fig. 1.

Fig. 5 is a section taken on line 5—5 of Fig. 1.

Fig. 6 is a fragmentary detail of the means for adjusting the stacker head lifting cable stop bar.

Fig. 7 is a detail side view of the stacker head showing the means for adjusting the inclination of the hay supporting rods thereof.

Fig. 8 is a perspective detail of the cable stop member.

The main supporting frame, designated generally by A, of the stacker is of substantial rectangular shape and includes the side sills or skids 1 which are properly braced in parallel spaced relation, these sills being provided adjacent their forward ends with uprights 2 rigidly secured thereto and reinforced by downwardly and rearwardly inclined braces 3 secured to the uprights adjacent the upper ends thereof and to a transverse brace bar 4 secured to the skids 1. Each of the skids is provided, at its forward end, with a U-member 5 pivotally secured thereto for facilitating attachment of traction means to the frame A.

A substantially vertically disposed bar 6 is pivotally mounted intermediate its ends, as at 7, on each of the braces 3 adjacent a transverse brace beam 8 secured to the uprights 2 and serving to hold the same in spaced relation. The upper ends of bars 6 are rigidly connected by a transverse brace bar 9. The lower end of each bar 6 is provided with a forwardly extending member 10 which is secured at its forward end to a tension coil spring 11 the forward end of which is secured to an ear 12 secured to the forward end of skids 1. These springs act to normally hold the striking frame, composed of bars 6 and brace bar 9, in substantial vertical position, and permit rocking movement of this striking frame about its axis 7 when struck by the stacking frame, the springs 11 acting to return the striking frame to normal position and, by this movement of the striking frame, to cause rearward movement of the stacking frame which is returned by gravity to its normal position.

A substantially V-shaped lifting frame 13 is rockably supported, at its base, upon a transverse supporting rod 14 secured in the skids 1. This lifting frame is normally disposed at a rearward and upward inclination and carries, at its apex, a grooved pulley 15. The pulley 15 receives a lifting cable 16 passed thereabout, one end of this cable being secured to an attaching member 17 swiveled in frame 13 below pulley 15, the cable being then passed forwardly about a grooved pulley 18 mounted on a central reinforcing beam 19 of the main frame A and then led rearwardly and passed over pulley 15, the cable being then led forwardly and passed over a pulley 20 mounted in a supporting bracket 21 carried by a central standard 22 positioned midway between the uprights 2. From the pulley 20, the cable is led downwardly and passed about a grooved pulley 23 carried by a pulley casing 24 slidable upon a vertically disposed rod 25 rigidly supported in front of standard 22. An expansion coil spring 26 is mounted about rod 25 and acts to normally hold pulley casing 24 in depressed position while permitting the necessary vertical movement of the casing and the pulley carried thereby.

The lifting frame 13 is connected, adjacent its upper end, by downwardly diverging connecting rods 27 to a transverse beam 28 secured at its ends to stacker lifting bars 29 which are disposed in parallelism with skid members 1 and are pivotally secured thereto at their forward ends, as at 30, for rocking movement about a common horizontal axis. The connecting rods 27 are pivoted to lifting frame 13 for rocking movement about an axis coincident with the supporting shaft for pulley 15 so that the power transmitted to this pulley is applied directly through the rods 27 to beam 28 for raising the bars 29.

A stacking head designated generally by B is positioned in rear of bars 29, this head being of greater length than the width of frame A. Head B is provided, adjacent each end, with a lifting arm 31 which is positioned outside of, and in parallel spaced relation to, the corresponding lifting bar 29. Arm 31 is slidable through a supporting and guide bracket 32 secured to bar 29 and beam 28, this bracket carrying an anti-friction guide roller 33 which engages the under surface of the arm for supporting and guiding the same. At its forward end, arm 31 is provided with a bracket 34 secured thereto which extends about bar 29, this bracket being provided with an anti-friction guide roller 35 which engages the under surface of the bar. The guide brackets and rollers coöperate to slidably connect the arms 31 of the stacking head to the lifting bars 29 so as to facilitate movement of the arms longitudinally of the bars while insuring accuracy of operation. Each bar 29 is provided, on the outer face thereof and adjacent bracket 32, with a grooved guide pulley 36 which receives a stacker raising cable 37 passed thereabout, one end of this cable being secured to a finger 38 fastened upon the forward end of arm 31 and projecting inwardly a short distance therefrom, the other end of the cable being secured through U-member 5. When the stacking frame and the parts associated therewith are raised, as in Fig. 2, the lower run of cable 37 engages an arcuate channeled stop member 39 carried by a stop bar 40 slidable in grooves 41 extending longitudinally of the skid members 1, the front edge of this bar being engaged by stop pins 42 adapted to be inserted through spaced openings 43 extending through strips 44 secured to the inner faces of the skid members. By means of the stop bar and the stop pins associated therewith, the point at which the lower run of the cable engages the stop member 39 may be readily varied so as to permit accurate adjustment of the extent of movement of the arms 31 outwardly longitudinally of bars 29, thus giving ready and accurate control of the height to which the stacker head B is raised during the stacking operation.

The stacker head B comprises a fixed member $b$ and an adjustable member $b'$. Member $b$ comprises a plurality of parallel hay receiving rods 45 secured at their inner or forward ends to a transverse reinforcing bar 46 and, intermediate their ends, to a similar bar 47. Member $b'$ comprises a plurality of hay supporting rods 48 disposed substantially at right angles to rod 45 and rigidly connected at their lower ends by a transverse bar 49. Rods 48 are swiveled, as at 50, to bar 46 so as to be capable of rocking movement about an axis extending longitudinally of head B. A crank shaft 51, which is disposed in parallelism with bar 47, is rockably mounted upon the under faces of rod 48, the cranks of this shaft being connected by links 52 to bar 49. Shaft 51 is provided, at one end, with a substantially rectangularly disposed finger 53 to which is pivotally connected the outer end of an adjusting arm 54 the lower edge of which is serrated for engagement with the edge of a locking and guide member 55 fixedly secured to arm 31, arm 54 being normally held in engagement with member 55 by a bowed leaf spring 56 secured upon the upper face of arm 31 of the stacker head.

In use, the hay to be stacked is placed upon the stacker head B by means of a sweep rake, or in any other suitable and well known manner. After a sufficient quantity of hay has been collected upon the stacker head, suitable traction means is attached to the free end of the main lifting cable 16 which is then drawn outwardly away from the stacker so as to rock the lifting frame 13 forwardly thus raising the stacking frame. Simultaneously with this raising of the stacking frame, the arms 31 of the stacker head B are slid outwardly along bars 29 so as to elevate the stacker head to the desired degree. When the bars 29, and the parts associated therewith, have been rocked forwardly slightly beyond a vertical position, these bars strike the top bars 9 of the striking frame, the forward movement of the stacking frame being thus suddenly arrested so as to cause discharge of the hay from the stacker head. The springs 11 permit slight forward give of the striking bar so as to absorb the shock incident to the sudden stoppage of the stacking frame, after which the springs contract so as to return the stacking frame to its initial position, this return movement of the striking frame causing rearward rocking movement of the stacking frame beyond the vertical, the stacking frame being then returned to its initial position by gravity. By adjusting the member $b'$ of stacker head B so as to vary the angular relation of rods 48 to rods 47, proper discharge of the hay from the stacker head, in the manner above described, may be insured.

It will be evident that there may be slight changes made in the construction and arrangement of the details of my invention without departing from the field and scope of the same, and I intend to include all such variations, as fall within the scope of the appended claims, in this application in which a preferred form only of my invention is disclosed.

What I claim is:

1. In a hay stacker, a main frame, including base and upright portions, a striking frame pivoted intermediate its ends to the upright portion of the main frame, a yieldable connection between the striking and main frames, a stacker frame pivoted to the main frame, a stacker slidably mounted on the stacker frame, connecting means between the stacker and the main frame for adjusting the stacker on the stacker frame and holding it in the required adjusted position, and means between the stacker frame and the main frame for effecting a pivotal movement of the stacker frame and a raising and a lowering of the stacker.

2. In a hay stacker, a main frame, including base and upright portions, a striking frame pivoted intermediate its ends to the upright portion of the main frame, a yieldable connection between the striking and main frames, a lifting frame pivoted to the main frame and having a pulley at its free end, members pivoted to the lifting frame in line with the axis of said pulley, a stacker frame pivoted to the main frame, a stacker slidable on the stacker frame, a flexible connection between the stacker, the free ends of said pivoted members and the main frame and having adjustable connection with the latter to adjust the height of the stacker and secure the same in the adjusted position, and means between the lifting, main and stacker frames for effecting a pivotal movement of the stacker frame and a raising and a lowering of the stacker.

3. In a hay stacker, a main supporting frame, a stacking frame pivotally secured thereto for movement on a horizontal axis, portions of said stacking frame being movable longitudinally with respect to the main frame, means for actuating said stacking frame to accomplish the longitudinal movement of a portion thereof and the rocking movement of the complete frame, and a striking frame comprising vertically disposed beams pivotally secured intermediate their ends to the main frame, an upper cross bar connecting said beams, forwardly extending members secured to the lower ends of said beams, and spring means between said last mentioned members and the main frame.

In testimony whereof I affix my signature in presence of two witnesses.

ALBERT L. VEEDER.

Witnesses:
P. M. BRYAN,
E. C. BYER.